June 2, 1953  C. C. TALLEY  2,640,910
CLEARANCE LAMP FOR VEHICLES
Filed Sept. 25, 1950

Inventor
Calvin C. Talley

By Clarence A. O'Brien
and Harvey B. Jacobson
Attorneys

Patented June 2, 1953

2,640,910

UNITED STATES PATENT OFFICE 2,640,910

CLEARANCE LAMP FOR VEHICLES

Calvin C. Talley, Levelland, Tex.

Application September 25, 1950, Serial No. 186,627

1 Claim. (Cl. 240—7.1)

This invention relates to a safety lamp for use with an automotive vehicle primarily designed to reduce accidents during night driving.

An object of the invention is to provide a lamp having a blue bulb and blue lens which is secured beneath the headlight in the front left fender of the vehicle and is operated through the light switch in the headlight circuit. The light serves as a signal to an approaching motorist that the body of the car is to the left of the blue light.

Another object of the invention is to provide a signal light of the character described which is simple, inexpensive, easy to operate, and effective in reducing accidents occurring in night driving.

These, together with various ancillary objects and features of the invention which will later become apparent as the following description proceeds, are attained by the device, a preferred embodiment of which has been illustrated by way of example only in the accompanying drawings, wherein.

Specific reference is now made to the drawings. In the several views in the accompanying drawings and in the following specification reference characters indicate corresponding elements throughout.

Figure 1:
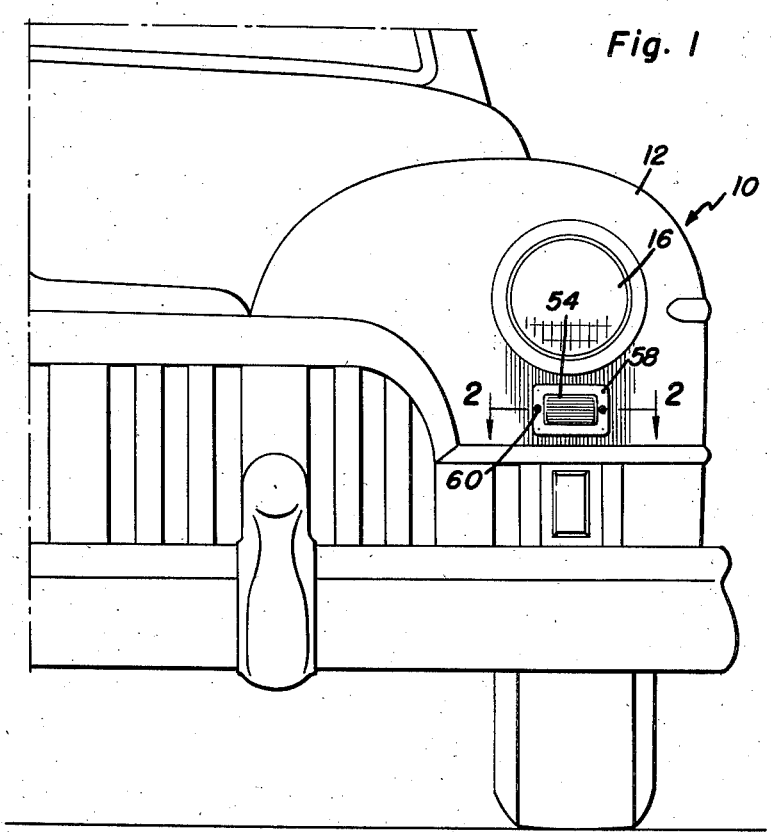
Figure 1 is a front view of the signal lamp shown assembled on a vehicle.

Indicated generally at 10 is a conventional automotive vehicle having front fenders 12 in which is set right and left headlights 14 and 16. The headlights are grounded as at 18 and operatively connected by conductive wires 20 to the two tail lights 22 which are in turn grounded as at 24. The conductive wires 20 are interconnected by a further wire 26 which is operatively associated with a light switch 28 which connects to one post of a battery 30 that is grounded as at 32.

The present signal light is indicated at 34 and is operatively connected by a conductive wire 36 to the tail light circuit and suitably grounded as at 38. The signal lamp or light includes a substantially rectangular housing 40 which is set into a suitable recess in the front left fender 12 beneath the headlight 16. Secured to the rear wall 42 of the housing by appropriate rivets 44 is a socket operatively connected to the conductive wire 36. Removably retained in the socket is a blue light bulb 48.

Figure 2:
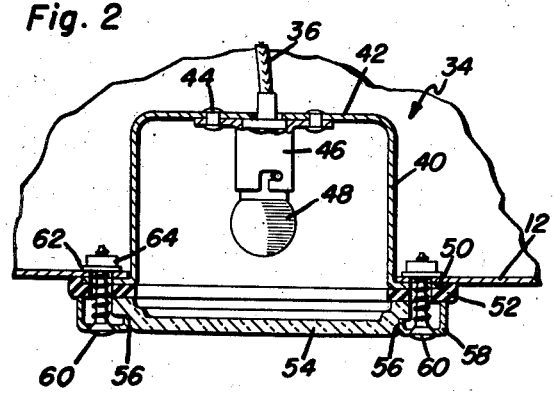
Figure 2 is a sectional view taken on the line 2—2 of Figure 1.
Figure 3:
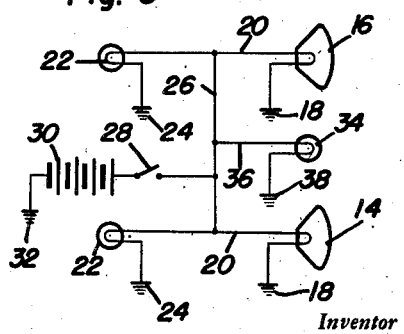
Figure 3 is a diagrammatic view of the electrical circuit controlling the signal light.

The front end of the housing is open and includes a peripheral flange 50 which abuts the outer surface of the fender and retained on the flange is a rubber gasket 52, the outer marginal portion of which is engaged with said fender and the free edge of said flange. A blue, preferably serrated, lens 54 is provided which rests upon the inner marginal portion of the gasket and includes a marginal recess 56 defining a rearwardly offset flange and engaged by one leg of a substantially U-shaped rim 58, the other leg of which presses against the outer marginal portion of the gasket 52, as shown clearly in Figure 2. To secure the rim to the housing and the housing to the fender, headed screws 60 extend through the rim 60, gasket 52, flange 50 and fender 12, the screws receiving washers 62 and nuts 64 at their free ends.

In practical operation, actuation of the light switch 28 will energize the headlights, the tail lights and the blue signal light. When driving at night, an approaching motorist will see the blue light on the left front fender and will know that the car body is to the left of the blue light thereby avoiding many unnecessary accidents.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A lamp of the character described mounted on a support having an opening therein, comprising a housing mounted in the opening and projecting rearwardly from the support, said housing having an open front, an external flange on the front of the housing overlying the support, a gasket mounted on said flange and including an outer marginal portion engaged with the support and the free edge of said flange, a lens including an offset marginal flange seated on the inner marginal portion of the gasket, a rim of substantially U-shaped transverse section having its inner edge seated on the second named flange and its outer edge engaged with said outer marginal portion of the gasket, said support, the first named flange, gasket and rim having aligned openings therein, screws engaged in the aligned openings, and nuts threaded on said screws and engaged with the support for securing the assembly in position thereon with said outer marginal portion of the gasket under compression between the support, said outer edge of the first named flange, and said outer edge of the rim.

CALVIN C. TALLEY.

References Cited in the file of this patent

UNITED STATES PATENTS

| Number | Name | Date |
|---|---|---|
| 1,521,833 | Paul | Jan. 6, 1925 |
| 1,800,078 | Johnson | Apr. 7, 1931 |
| 2,244,737 | Stewart | June 10, 1941 |
| 2,338,559 | Winkelmeyer | Jan. 4, 1944 |
| 2,434,049 | Nordquist | Jan. 6, 1948 |